March 6, 1956

G. C. SUMMERS ET AL 2,737,639

ELECTROMECHANICAL ACOUSTIC PULSER

Filed March 23, 1953

GERALD C. SUMMERS
JOHN O. ELY
INVENTORS

BY D. Carl Richards
ATTORNEY

United States Patent Office 2,737,639
Patented Mar. 6, 1956

2,737,639

ELECTROMECHANICAL ACOUSTIC PULSER

Gerald C. Summers and John O. Ely, Dallas, Tex., assignors, by mesne assignments, to Socony Mobil Oil Company, Inc., a corporation of New York Application March 23, 1953, Serial No. 344,119

9 Claims. (Cl. 340—18)

This invention relates to an electromechanical transducing system and more particularly to a system for translating energy from an electrical source at a low peak power requirement into periodically recurring acoustic pulses in a well bore.

In co-pending application Serial No. 181,284 of Pat McDonald for Acoustic Well Logging System, now U. S. Patent No. 2,722,282 which issued on November 1, 1955, Serial No. 192,750 of Gerald C. Summers for Velocity Well Logging, now U. S. Patent No. 2,704,364 which issued March 15, 1955, and Serial No. 197,074 of Gerald C. Summers et al. for Selective Pulse Acoustic Well Logging, now U. S. Patent No. 2,691,422 which issued on October 12, 1954, systems are disclosed which utilize sharp, spaced apart acoustic pulses for probing formations adjacent a well bore. In one case the transit time of the acoustic pulses over an earth section of predetermined length is measured. In another case the attenuation character of such section is measured. Either procedure requires a reliable source of sharp, high energy acoustic pulses.

In accordance with the present invention there is provided a generator of acoustic pulses having high energy at a repetition rate in the low audio range in a manner particularly advantageous for conducting acoustic well logging operations.

More particularly, there is provided a pulsing system for translating electrical energy from an alternating current source into repeatedly occurring high energy acoustic pulses in a well bore which includes an exploring unit supporting an electro-acoustic transducer. A constant current or emission saturated supply of unidirectional current is connected at its input to the source of alternating current power and at its output to the transducer. A gaseous discharge means connected in parallel with the transducer repeatedly reduces the charge on the transducer to zero from predetermined maximum values.

In accordance with a further aspect of the invention there is provided a rectifier for producing a high voltage in the limited confines of a bore hole exploring unit in which alternating current is applied at low potential to the primary winding of a transformer for the production of a high potential across a secondary winding thereof. A means for utilizing unidirectional current is connected at one terminal to one extremity of the transformer secondary winding and at its other terminal to the anode of the rectifier. The heater of the rectifier is connected across a predetermined fraction of the secondary winding near the other extremity thereof to excite it preferably at a level below its rated level to limit current flow through the rectifier to a substantially constant level and at the same time to provide reliable isolation for back voltages developed upon excitation of the transformer.

For further objects and advantages of the present invention and for a further understanding thereof, reference may now be had to the following description taken in conjunction with the accompanying drawings in which:

Fig. 3 is a modification of a portion of the circuit of Fig. 1.

Figure 1:
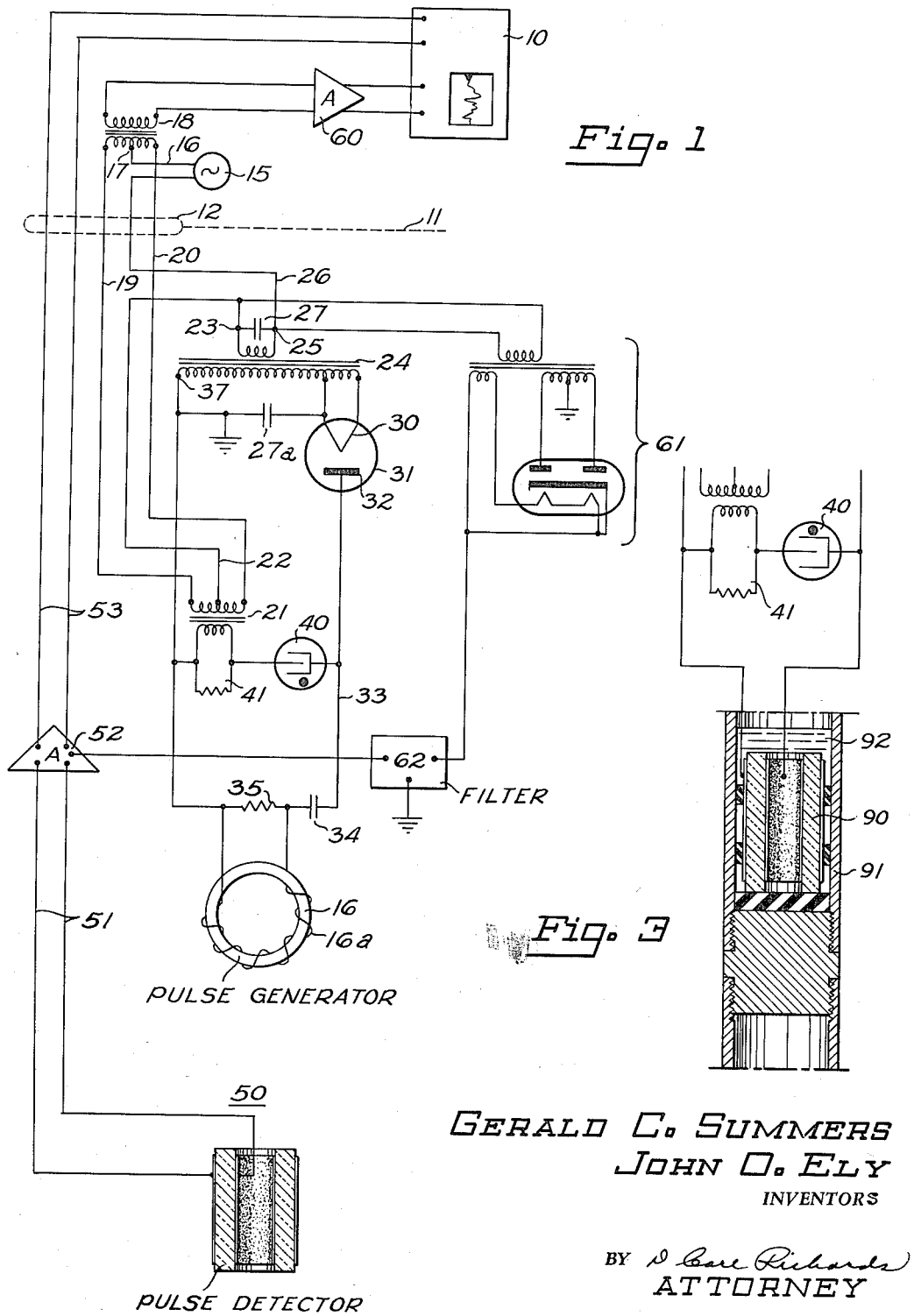
Fig. 1 is a schematic diagram of the invention.

Referring first to Fig. 1, it is to be understood that an important object in acoustic logging is to produce an indicia suitable for recording by some convenient means, such as recorder 10, at the earth's surface wherein the indicia preferably is related to or primarily controlled by a given selected parameter of the earth formations. For the purpose of the present description, it will be assumed that recording system 10 and the additional elements positioned in the drawing above the dotted line 11 are surface components of the logging system and are connected to components below the earth's surface as in a bore hole by cable means shown generically as included within the dotted outline 12. Thus the components of Fig. 1 below the dotted line 11 are housed in an exploring unit (not shown) which is supported by the cable means in a suitable manner for movement along the length of the bore hole.

Keeping the foregoing in mind, the present invention relates to an improved system for translating energy from an electrical source, such as an alternating current generator 15, into high power acoustic pulses repeatedly occurring in time by an electromechanical transducer 16 positioned in the bore hole.

In the system illustrated in Fig. 1 there is included a phantom circuit connected between source 15 and the downhole exploring instrument which serves as a means for transmitting electrical energy downhole and for transmitting a time reference pulse back to the surface. More particularly, generator 15 is connected by way of conductor 16 to the center tap 17 on the primary winding of a transformer 18. Conductors 19 and 20, connected to the extremities of the secondary winding of transformer 18, extend through the bore hole to the exploring unit where they are connected to the extremities of the secondary winding of a transformer 21. Conductor 22 is connected to the center tap of the secondary winding of transformer 21 and also is connected to terminal 23 on the primary winding of a power transformer 24. The second terminal 25 on the primary winding is connected by way of a conductor 26 to the second terminal of the generator 15 completing the circuit from source 15 to transformer 24.

A condenser 27 is connected across the terminals 23 and 25 of the primary winding of transformer 24. In a like manner a condenser 27a is connected across the terminals of the secondary winding of transformer 24. These condensers reject or shunt high frequency transients that may appear in transformer 24 and prevent them from appearing on cable circuits associated with the transmission of power and bore hole signals to and from the exploring unit.

In the circuit of the secondary winding of transformer 24 there is provided a rectifying means connected in circuit with the transducer 16 for supplying a charge at relatively high potential which is periodically discharged to generate the desired acoustic pulses. More particularly, the cathode 30 of a vacuum tube rectifier 31 is connected across a minor fraction of the secondary winding of transformer 24 and is heated by current induced into the latter fraction. The anode 32 of rectifier 31 is connected by way of a circuit including conductor 33, capacitor 34 and resistor 35 to the second extremity or terminal 37. The terminal 37 is connected to a ground potential point on the exploring unit.

The transducer 16 in this system comprises a magnetostrictive device having a core structure with a winding 16a disposed around the laminations to form a toroidal inductive device. The winding 16a is connected across or in parallel with resistor 35.

A gaseous discharge device 40 is connected in series with a low resistance network 41, as to be in parallel with the transducer circuit comprising transducer 16 with its winding 16a, charge storing device 34 and resistor 35. The inductance in circuit 41 is the secondary winding of transformer 21.

In operation alternating current from source 15 applied to the primary winding of transformer 24 induces a high potential in the secondary winding thereof. The minor fraction of the secondary winding across which the cathode 30 is connected is so selected as to be well below the rated cathode potential of the particular rectifying device so that, in response to the potential between cathode and anode as induced in the remaining portion of the secondary winding of transformer 24, a substantially constant current flows through tube 31 on positive half-cycles to build up a charge on condenser 34 at a correspondingly constant rate. When condenser 34 is charged to the breakdown potential of the discharge device 40, the charge thereacross is reduced to zero. The discharge of condenser 34 through tube 40 produces a voltage across resistor 35 which abruptly energizes winding 16a to produce variations in the dimensions of the core structure. Such dimensional changes properly coupled, as well understood by those skilled in the art, to adjacent bore hole fluids and thence to formations may then be received by a pulse detector, such as detector 50, whose output is transmitted to the surface measuring system 10 by way of conductors 51, amplifier 52 and the cable conductors 53.

The dissipation of energy by current flow through winding 16a upon discharge of condenser 34 may occur at an extremely high instantaneous value, but the power requirements for the source of such charge are maintained at a fixed low controlled efficient level by the emission saturated operation of the rectifier 31. By causing the potential effective for discharge of device 40 to rise more linearly than exponentially as in prior art systems, the pulse repetition rate may be more accurately controlled by reason of the fact that operation is upon a straight curve rather than on the substantially flat portion of the more familiar exponential curve characteristic of a condenser charging cycle.

In systems where it is desired to measure only variations in amplitude of the pulse received by the pulse detector 50, the tube 40 assures the production of constant amplitude pulses by transducer 16 so that the magnitude of pulses from detector 50 may be measured and recorded as a function of depth by recorder 10 to depict attenuation properties of the formations.

In contrast to the latter procedure, provision is made in the system of Fig. 1 for permitting measurement of the time of travel of a pulse from transducer 16 to detector 50. A reference electrical pulse is produced coincident with the production of each acoustic pulse by transducer 16 and is transmitted to the surface. More particularly, upon discharge of condenser 34 through device 40 an abrupt pulse is produced across the network 41 inducing a corresponding pulse in the secondary winding of transformer 21. The latter pulse is then transmitted to the surface on conductors 19 and 20 and is induced into the secondary winding of transformer 18 where it is applied to amplifier 60 and then applied to the measuring system 10 as a reference pulse. The above-identified Patent No. 2,704,264 discloses the details of utilizing such reference pulse and the subsequently received pulse from detector 50 in order to measure the travel time of a pulse through the formations in the interval between the transducers 16 and 50.

A second power supply has been illustrated in Fig. 1 as comprising the rectifying unit 61 and filter 62 to provide an operating potential for circuits in the amplifier 52 in order to increase the level of the received pulse for transmission uphole.

Figure 2:
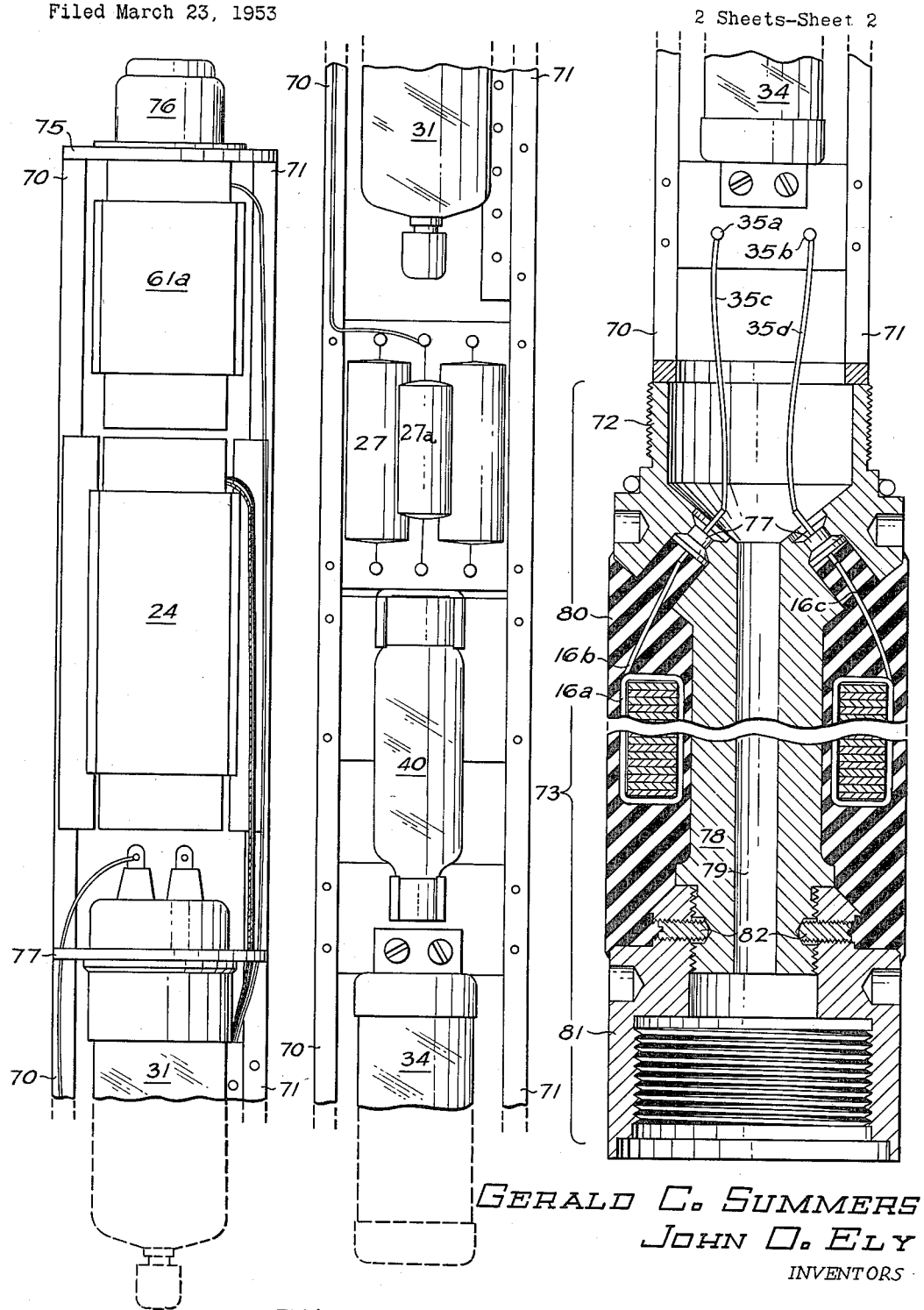
Fig 2 is an elevation view partially in section showing construction and arrangement of various parts comprising the pulsing system of Fig. 1.

Referring now to Fig. 2, the structural details of applicants' pulsing system have been illustrated in a form particularly suitable for bore hole operation. The pulsing unit has been shown in three sections in order to approximate the relative proportions of the elements thereof. It is to be understood that the elements shown in Fig. 2 and supported by the two elongated frame elements 70 and 71 are encased within a water-tight, pressure resistant housing which threadedly engages the thimble unit 72 of the transducer supporting structure 73.

The supporting rods 70 and 71 are secured at their upper ends to a disk 75 which in turn supports a multi-terminal plug device 76 as to provide a connecting link for circuits from the supporting cable to the pulsing unit and to amplifier sections connected to the lower end of the structure 73.

A first transformer 61a is supported at the upper end of the unit adjacent the plug 76. A second transformer 24 is supported immediately adjacent transformer 61a. The rectifying tube 31 is supported on a disk 77 secured to rods 70 and 71. Condensers 27 and 27a are supported on a suitable bracket immediately adjacent the anode of tube 31. The gaseous discharge device 40 is positioned therebelow and adjacent to the charge storing condenser 34. The resistance 35, not shown in Fig. 2, is connected across terminals 35a and 35b. Conductors 35c and 35d lead to glass sealed feed-through terminals 77. The winding 16a is connected by way of extensions 16b and 16c through the feed-through terminals 77.

The core structure for the toroidal magnetic transducer 16 is shown here in detail together with its winding 16a. The magnetostrictive core structure comprises a plurality of washer-shaped laminations. The transducer structure encircles a rigid spindle 78 having a central aperture extending therethrough. The transducer 16 is supported in a spaced relation with respect to the spindle 78 by a moulded rubber mass 80 which completely fills the portions of the structure around and adjacent the spindle as to conform with the cylindrical upper portions of the exploring unit. A nut member 81 threadedly engages the lower end of the spindle 78 and is rigidly secured, once in place, by the set screws 82. The lower end of the nut 81 is threaded internally to receive coupling members for additional units such as an acoustic insulator which will support the pulse detector 50, Fig. 1, in a predetermined spaced relation with respect to the pulse transmitter 16.

It will be seen that the pulse transmitter comprises a minimum of elements conveniently disposed along the length of the supporting structure to fit within the periphery of a cylindrical housing and yet sufficient to provide a high current discharge through the magnetostrictive transducer 16.

Of particular advantage is the provision of an intermediate tap on the secondary winding of transformer 24 to provide voltage for heating the filament of rectifier 31. It is to be appreciated that, within the space restrictions inherently present in a logging tool, the problem of insulating against high voltages becomes serious. Applicants' construction meets this problem in a convenient and satisfactory manner. By connecting the heater 30 of the rectifier 31 directly to the secondary winding of transformer 24, the rectifier itself withstands the back voltage. If a separate filament transformer were to be used, the anode 32 of the rectifier 31 would be connected to one end of the power transformer secondary winding and the opposite end of the power transformer secondary winding would be connected to ground and the windings of the filament transformer would have to be insulated as to withstand the back voltage. The space requirements would thus be greatly increased. By providing the novel system herein disclosed, applicants have completely eliminated the necessity for such filament transformer and have avoided the attendant insulation problem.

In Fig. 3 a part of the circuit of Fig. 1 has been modified to accommodate a piezo-electric transducer. As here shown, a piezo-electric cylinder 90 is supported inside a tubular housing 91 and is inundated in a liquid 92. Housing 91 is preferably liquid-tight and pressure resistant in order to maintain the transducer 90 free from the extreme pressures encountered in bore holes. The liquid 92 provides a coupling medium for transmission of acoustic energy to the housing 91.

The transducer 90 preferably is of the type employing piezo-electrically active ferro-electric poly-crystalline dielectric materials and thus capable itself of storing a charge of considerable magnitude. The discharge element 40 and the network 41, connected in series, form a circuit which is connected in parallel to the transducer 90. The electrical charge flowing onto transducer 90 builds up a potential at a substantially linear rate and is abruptly dissipated when ionization takes place in device 40. The abrupt discharge of the transducer produces an abrupt dimensional change which then appears as an acoustic pulse in the adjacent formations.

While there are different combinations of elements suitable for operation as above described, the following given by way of example and not by way of limitation have been found to be particularly suitable for use in a transducer unit employing the elements shown in Fig. 1:

Transformer 24: 70 volts primary and 3500 volts secondary with an intermediate tap at 2½ volts;
Transformer 16: A 3-inch stack of high quality magnetic materials approximately 10 mils thickness, with 80 turns of No. 18 wire;

Rectifier 31 _____ 3B24W.
Gas discharge tube 40 _____ 1B22.
Condenser 34 _____ .05 microfarad.
Resistance 35 _____ 1000 ohms.
                                     10 watts.

While the invention has been described in connection with several modifications thereof, it is to be understood that further modifications may now appear to those skilled in the art and it is intended to cover such modifications as fall within the scope of the appended claims.

What is claimed is:

1. Pulsing means for translating electrical energy from an alternating current power source into repeatedly occurring acoustic pulses in a well bore which comprises an exploring unit including an electro-acoustic transducer, an emission saturated supply of unidirectional current connected at its input to said alternating current source and at its output to said transducer, and gaseous discharge means connected in parallel to said transducer means for discharge of said transducer when the potential across said discharge means reaches a predetermined level.

2. Pulsing means for translating electrical energy from an alternating current power source into repeatedly occurring acoustic pulses in a well bore which comprises an exploring unit including a piezo-electric transducer, an emission saturated supply of unidirectional current connected at its input to said alternating current source and at its output to said transducer, and gaseous discharge means connected in parallel to said transducer means for discharge of said transducer when the potential across said discharge means reaches a predetermined level.

3. Pulsing means for translating electrical energy from an alternating current power source into repeatedly occurring acoustic pulses in a well bore which comprises an exploring unit including an electro-acoustic transducer, a charge storage means in circuit with said transducer, an emission saturated supply of unidirectional current connected at its input to said alternating current source and at its output to said charge storage means, and gaseous discharge means connected in parallel to said charge storage means for discharge of said transducer when the potential across said discharge means reaches a predetermined level.

4. A system requiring low average power in translating electrical energy into repeatedly occurring high energy acoustic pulses in a bore hole which comprises an exploring unit supported for movement along the length of said well bore having a transducer supported thereby, charge storing means, a source of alternating current voltage, means including a rectifier interconnecting said source and said charge storing means circuit means for limiting flow of current in each half-cycle of said voltage from said rectifier to a substantially constant level, and a gaseous discharge means connected across said transducer for periodically reducing the stored charge to a zero level coincident with the arrival of the voltage across said charge storing means at a predetermined peak value thereby to actuate said transducer.

5. A system requiring low average power in translating electrical energy into repeatedly occurring high energy acoustic pulses in a bore hole which comprises an exploring unit supported for movement along the length of said well bore and supporting a magnetostrictive transducer, charge storing means, a source of alternating current voltage, means including a rectifier connected to said charge storing means, a circuit connection between said rectifying device and said source for limiting flow of current to said storing means in each half-cycle to a substantially constant rate, a gaseous discharge means connected across said storing means for periodically reducing the stored charge to a zero level when the voltage across said charge storing means reaches a predetermined peak value, and circuit means interconnecting said transducer and said storing means for current flow therethrough upon actuation of said discharge means, thereby to actuate said transducer means.

6. A system requiring low average power in translating electrical energy into repeatedly occurring high energy acoustic pulses in a bore hole which comprises an exploring unit supported for movement along the length of said well bore and supporting a transducer of piezo-electrically activated ferro-electric poly-crystalline material for storage of an electrical charge, a source of alternating current voltage, means including a rectifier connected to said transducer, circuit means connecting said rectifier to said source for limiting flow of current through said rectifier device during half-cycles of said voltage to a substantially constant level, and a gaseous discharge means connected across said transducer for periodically reducing said charge to zero coincident with the arrival of the voltage across said transducer at a predetermined peak value for periodic electromechanical actuation of said transducer.

7. A pulser for generating repeatedly occurring acoustic pulses in a bore hole which comprises an electro-acoustic transducer means having a pair of terminals and supported by cable means for movement along the length of a bore hole and having charge storage means associated therewith, a transformer connectable at its primary winding through said cable means to an alternating current supply source at the earth's surface and having a secondary winding connected to an electrical ground at a first extremity thereof, a rectifier having its cathode connected at the other extremity of said secondary winding and energized by currents induced in a predetermined fraction of said secondary winding and adapted to produce emission operation of said rectifier, circuit means interconnecting the anode of said rectifying device and one terminal of said transducer means, circuit means interconnecting the second terminal of said transducer means and said grounded extremity of said secondary winding for applying to said transducer means a unidirectional potential proportional to the voltage induced in said secondary winding minus the voltage across said predetermined fraction, and a shunt circuit connected across said transducer means and including a gaseous discharge device having a breakdown potential approximately equal to $$\frac{Ck}{R}$$

where C is the capacitance of said charge storing means, R is the desired repetition rate of pulses to be produced and $k$ is the rate of current flow through said rectifying device wherein said predetermined fraction is so selected that $k$ is substantially constant.

8. A power supply for a well logging system having electrically actuated circuits supported in a cylindrical housing of restricted size as to permit movement through a well bore which comprises a power transformer having a low voltage primary winding and a high voltage secondary winding supported within said housing, an emission saturated diode rectifier having an anode terminal and a pair of heater terminals with a first of said pair connected to one extremity of said secondary winding, means including a utilization circuit interconnecting said anode terminal and the other extremity of said secondary winding, and means for connecting the second of said pair of heater terminals to an intermediate tap on said secondary winding to apply a voltage thereto not to exceed the rated voltage of said heater whereby said diode rectifier forms the isolation means for withstanding the back voltage produced upon excitation of said primary winding.

9. A constant current power supply for a well logging system having electrically actuated circuits supported in a cylindrical housing of restricted size as to permit movement through a well bore which comprises a power transformer having a low voltage primary winding and a high voltage secondary winding supported within said housing, an emission saturated diode rectifier having an anode terminal and a pair of heater terminals with a first of said terminals connected to one extremity of said primary winding, means including a utilization circuit interconnecting said anode terminal and the other extremity of said secondary winding, and means for connecting the second of said pair of heater terminals to an intermediate tap on said secondary winding to apply a voltage thereto approximately one-half the rated voltage of said heater whereby the current flow is limited by the excitation of said heater and said diode withstands the back voltage produced upon excitation of said primary winding.

References Cited in the file of this patent

UNITED STATES PATENTS

| 2,097,066 | Hoover | Oct. 26, 1937 |
| 2,280,725 | Shepard | Apr. 21, 1942 |
| 2,315,757 | Wenger | Apr. 6, 1943 |
| 2,465,131 | Sundt | Mar. 22, 1949 |
| 2,530,971 | Kean | Nov. 21, 1950 |
| 2,586,745 | Tullos | Feb. 19, 1952 |

FOREIGN PATENTS

| 453,512 | Great Britain | Sept. 14, 1936 |